United States Patent Office 3,190,585
Patented June 22, 1965

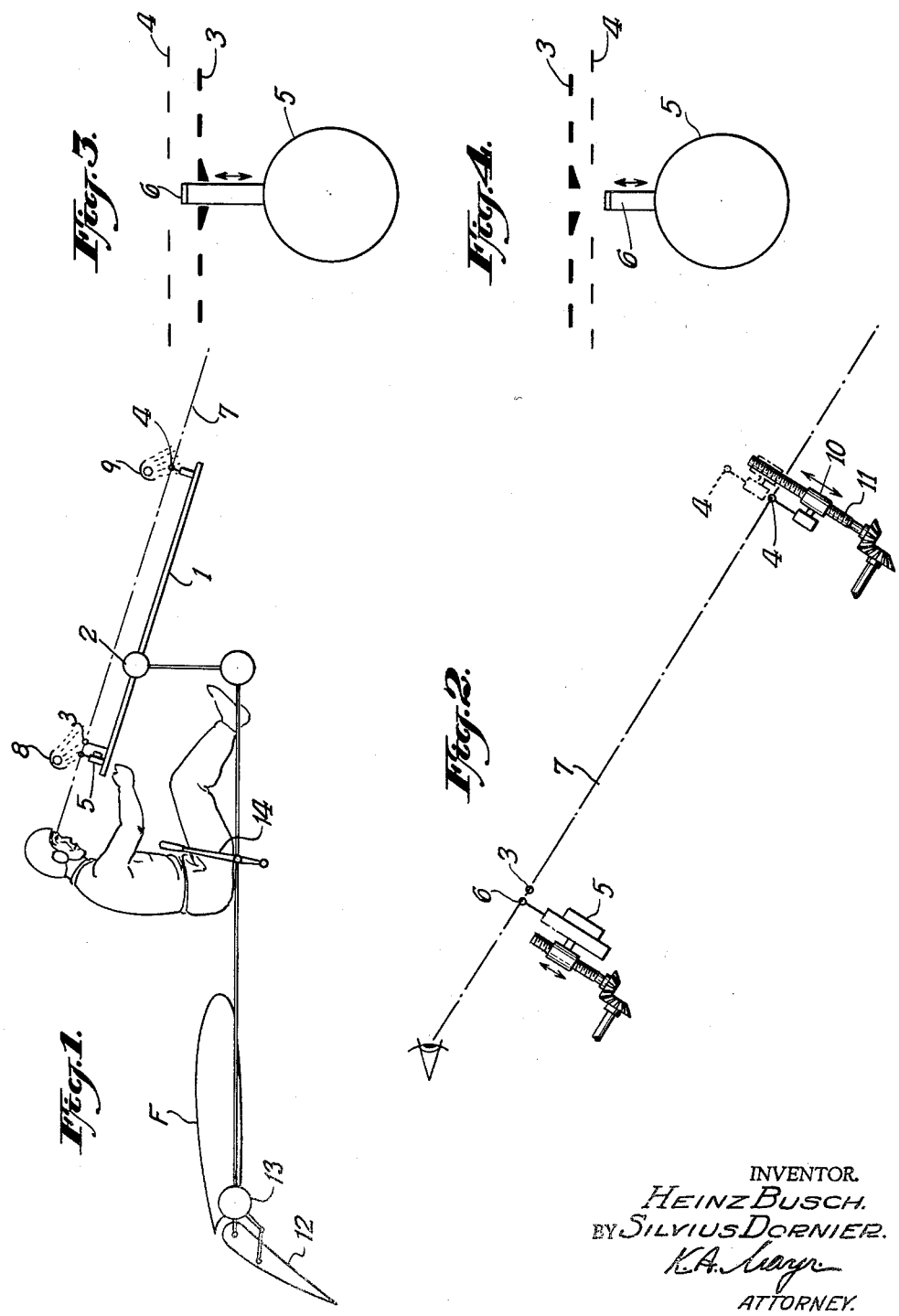

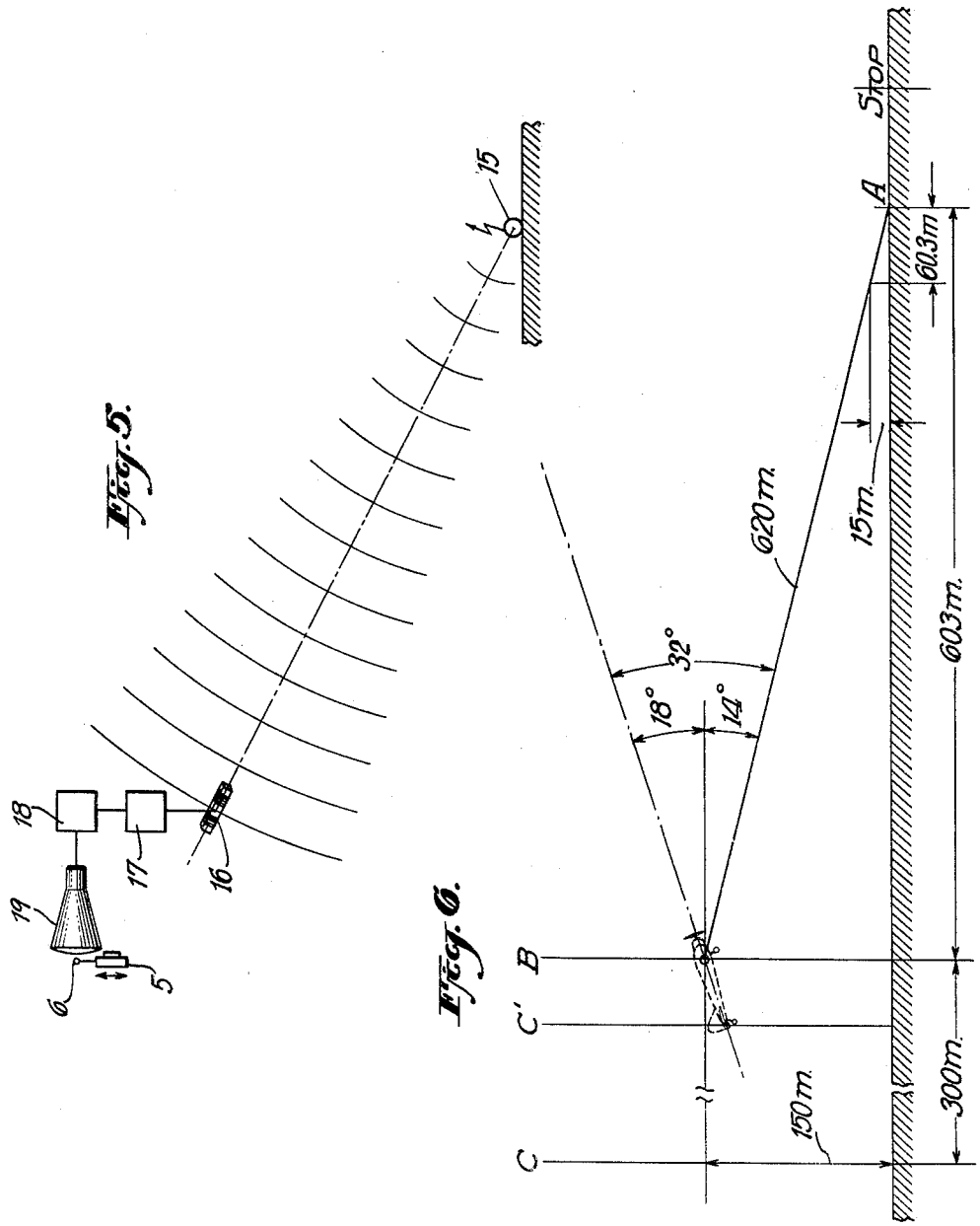

3,190,585
LANDING SYSTEM FOR AIRCRAFT
Heinz Busch, Friedrichshafen, and Silvius Dornier, Kressbronn, Germany, assignors to Dornier-Werke G.m.b.H., Friedrichshafen, Germany, a firm of Germany
Filed Feb. 5, 1962, Ser. No. 170,974
Claims priority, application Germany, Feb. 9, 1961, D 35,376
2 Claims. (Cl. 244—75)

The present invention relates to a landing system for aircraft whereby the aircraft approaches the desired landing point at a predetermined angle of glide or descent.

Conventional landing systems are most suitable for aircraft which approaches the airport at a rather small angle of descent of 2° to 3°. The apparatus for the conventional systems, for example, lighting apparatus or electronic apparatus are so expensive that they are economical only in a few large and busy airports. Electronic systems require bulky and expensive apparatus on board the aircraft. The conventional landing systems require adequate ground visibility at least near the ground and a horizontal visibility of up to 1.5 km. or, at otherwise favorable conditions, at least 800 m.

The conventional systems are not suitable for aircraft adapted to approach the airfield at a relatively great angle of descent.

It is an object of the invention to provide a landing system for aircraft which permits precision landing at a relatively great angle of descent of about 12° and even greater angles.

A further object of the invention is to provide a landing system for aircraft permitting a rather steep descent of the aircraft and requiring simple and relatively inexpensive apparatus.

With the system according to the invention the aircraft is controlled by aerodynamic means, such as flaps and the like and approaches the airfield at full power at a steep angle of descent. The aircraft is operated at an optimal angle of glide whereby its longitudinal axis is inclined at a predetermined angle with respect to the horizontal. The aircraft maintains its flying position until it touches the ground and does not require flattening out. The touchdown occurs at the full sinking speed and the force involved thereby must be absorbed by the undercarriage.

The system according to the invention affords landing not only in daytime but also in the dark. The apparatus required by the new system on the ground and on board of the aircraft are small, light and inexpensive and require little maintenance and power or energy. The system according to the invention operates reliably at minimum visibility.

Since landing is effected at constant sinking speed and there is no flattening out, the desired landing point on the ground can be aimed and the aircraft touches the ground at considerable speed in the immediate neighborhood of the aimed landing point.

The apparatus according to the invention comprises a sighting device built into the aircraft and having a line of sight extending to the chosen landing point during the landing operation at a predetermined angle of descent. The apparatus also includes angle of pitch indicating means movable in a vertical plane and normal to the line of sight. The apparatus according to the invention, in its simplest form, can be used for steep landings and does not require any special installation on the ground, if visibility is good. The apparatus affords landing at or close to the chosen landing point also at considerable wind gradients. The extent of possible deviations from the chosen landing point primarily depends on the size of the aircraft.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a diagrammatic side elevation of an apparatus according to the invention.

FIG. 2 is an enlarged diagrammatic side elevation of portions of the apparatus shown in FIG. 1.

FIGS. 3 and 4 diagrammatically illustrate relative positions of the rear sight, the front sight, and the glide angle indicator of the apparatus according to the invention at different positions of an aircraft in the air and relative to the landing point.

FIG. 5 is a diagrammatic illustration of a modification of the apparatus according to the invention suitable for blind flying.

FIG. 6 is a diagram showing a gliding angle landing according to the invention.

Referring more particularly to FIG. 1 of the drawing, numeral 1 designates a frame swingably connected at 2 to the fuselage of an airplane, not shown. Mounted on the frame 1 is a rear sight 3 and a front sight 4 of a sighting device. In the simplest form of the invention the rear sight and the front sight are rigidly built into the fuselage in such positions that the pilot can sight without changing his normal position in the airplane. With the airplane in the correct position for the landing operation, considering its flight characteristics and wind and weather conditions, the line of sight 7 including the rear sight, the front sight and the point on the ground where landing is desired, is parallel to the flight path. To correctly position the airplane the pilot operates tab, rudder, flaps and power in the conventional manner. Lateral deviations of the flight path from the desired flight path are immediately discovered by means of the sighting device and can be compensated by turning the airplane around its vertical axis.

Upward and downward movement of the landing point relative to the line of sight are primarily caused by the wind force and the high wind gradients when the airplane moves against the wind as is desired when landing. These vertical deviations of the airplane cause a positive or negative change of the gliding angle which must be corrected by the pilot by changing the lift coefficient.

According to the invention a gliding angle indicator 5 is mounted on the frame 1. This indicator, in its simplest form, is a conventional pitch angle indicator whose indications are converted to gliding angle indications by changing the scale of the indicator. The gliding angle indicator may be a separate element operatively connected to a pitch angle indicator by means of a cam follower following a cam mounted on a shaft forming part of the pitch angle indicator and being rotated through angles corresponding to the pitch angles of the aircraft. By suitably shaping the cam the pitch angle indications are converted to gliding angle indications. Instead of mechanically interconnecting the pitch angle indicator and the gliding angle indicator, a connection using conventional electrical means may be used. An electronic computer may be interposed between the pitch angle indicator and the gliding angle indicator, affording feeding-in of signals corresponding to values which influence the gliding angle and change the relation between the gliding angle and the pitch angle, for example speed, air density, temperature, and others.

As shown in FIG. 2, the gliding angle indicator 5 has an indicating element 6 which is movable at a right angle to the line of sight 7 and in a plane containing the normal axis of the airplane. The element 6 is in the line of sight 7 when the gliding angle of the airplane is optimal for the landing operation. The angle of pitch of airplanes is limited. In order to make a steep landing descent the airplane must be held at an angle of pitch as close as possible to the permissible maximum angle of pitch, including a reasonable safety factor. The pilot must be warned when the maximal permissible angle of pitch is exceeded. This is done by the indicating element 6 of the gliding angle indicator. If the element 6 moves below the line of sight 7, the airplane approaches the maximal permissible angle of pitch and the pilot must manipulate the conventional devices to return the airplane to the desired position.

FIG. 3 shows the indicating element 6 above the rear sight 3 and below the front sight 4 whereby the line of sight is too flat and the plane would not reach the landing point although the angle of pitch of the airplane is permissible. The pilot must sight more exactly and manipulate the respective conventional devices for the correct line of sight to coincide with the gliding angle.

FIG. 4 shows the rear sight 3 above the front sight 4, indicating that there is no exact line of sight and the plane would overshoot the landing point and the pilot must operate the respective conventional devices to ensure coincidence of the line of sight with the gliding angle. FIG. 4 shows the indicating element 6 below both the rear sight and the front sight, indicating that the pitch angle approaches a dangerous value and conventional means must be actuated to move the element 6 in upward direction.

The apparatus described so far is suitable only for daylight use and when the visibility is good. For night flying and at adequate visibility, the landing point must be lighted and also the elements 3, 4 and 6 which may be done by lights 8 and 9, shown in FIG. 1, or these elements must be made luminous.

The gliding angle for making a satisfactory landing depends, for example, on the load on the aircraft and the sighting device must be adjusted accordingly. This can be done by changing the vertical position of one or both sights, for example, by mounting each sight on an internally threaded member 10 accommodating a threaded spindle 11 which can be rotated by means of bevel gears, as shown in FIG. 2. This figure shows the front sight 4 in dotted lines in elevated position. The glide angle indicator 5 may also be adjustably mounted to change its position relative to the line of sight of the sighting device. As seen in FIG. 2 an adjusting apparatus similar to that used for the sights of the sighting device can be used for the glide angle indicator.

If desired, the position of the entire sighting device may be changed by mounting the sights on a swingably supported frame 1, as shown in FIG. 1, and changing the angular position of the frame. Since the glide angle of the aircraft depends on the position of the landing flaps, the frame 1 may be operatively connected to the means for actuating the landing flaps, as is diagrammatically shown in FIG. 1. Landing flaps 12 are actuated by conventional actuating means 13 which are not shown in detail and which can be manipulated by the pilot, a handle 14 being provided for this purpose. This handle is also operatively connected to the frame 1 for swinging the frame on the fulcrum 2 simultaneously with the adjustment of the landing flaps for changing the glide angle of the aircraft.

The optimal gliding angle landing system according to the invention can also be implemented to permit its use if there is no ground visibility. FIG. 5 diagrammatically illustrates the system according to the invention adapted for blind flying. Numeral 15 designates a sender emitting electromagnetic rays having a circular radiation pattern and being placed on or below the ground at the landing point. A directional antenna system 16 is built into the aircraft and connected in the conventional manner to a receiver 17 feeding signals through a transmitter 18 into a cathode-ray tube 19. The indicating means 6 of a gliding angle indicator 5 is placed in front of the tube 19. The position of the indicator 5 can be adjusted in the same manner as shown in FIG. 2, or in any other suitable manner. The landing point appears as luminous spot on the screen of the tube 19 and horizontal and vertical deviations are made visible. The gliding angle indications of the angle of pitch indicator are used in the same manner as described previously and the pilot can perform the same landing operation as has been described for conditions when the landing point is visible. In blind landing the pilot observes the luminous point on the screen of the cathode tube in lieu of the actual landing point.

FIG. 6 diagrammatically illustrates an example of a gliding angle landing according to the invention. The airplane approaches the landing point at an optimal gliding angle between 12° and 14° and touches the ground at the full sinking speed defined by the flight path, without flattening out. The angle of pitch of the airplane is optimal and the longitudinal axis of the airplane is upwardly inclined by 18° with respect to the horizontal. The plane of FIG. 6 is the vertical plane containing the flight path and the landing point. The airplane which is supposed to touch the ground at A comes from C at about 150 m. above the ground. Upon reaching the point C' the landing flaps have been protracted and the engine power has been adjusted to that prescribed for landing. The pilot now operates the elevator and adjusts the longitudinal trim for raising the airplane until its angle of incidence is 32°. The adjustments are so made that at this angle of pitch the flight path is at an angle of 14° with respect to the horizontal and the longitudinal axis of the airplane is upwardly inclined by an angle of 18°. If the pilot correctly estimated altitude and distance of the airplane from the landing point, he sees the landing point A close to the line of sight of the sighting device when reaching position B. The line of sight coincides with the flight path of the airplane. By means of an inclination indicator built into the sighting device as described supra, the pilot controls the angle of the longitudinal axis with respect to the horizontal, which angle depends on the aerodynamic flight characteristics of the airplane and forms with the angle of the flight path with respect to the horizontal the angle of incidence of the airplane. The indicating means of the inclination indicator is in the plane of sight of the sighting device if the inclination of the longitudinal axis of the airplane with respect to the horizontal amounts to 18° and the pilot sees over the rear sight and the front sight also the indicating means of the inclination indicator which is in the plane of sight of the sighting device, and also the landing point within or slightly above the line of sight.

If the aforesaid flight conditions are maintained and there are no wind gusts and horizontal wind influence, the airplane approaches the landing point A on the illustrated flight path which is at an angle of 14° with respect to the horizontal. In this case, a 15 m. high obstruction placed 60.3 m. in front of the landing point A is not hit by the airplane.

The diagram FIG. 6 is based on a horizontal flying speed of the airplane of 20 m./sec. between B and A whereas the average speed of the airplane between C and C' is 30 m./sec. The sinking speed between B and A is 5 m./sec. and the airplane touches the ground at this sinking speed and at a horizontal speed of 20 m./sec.

We claim:

1. A system for landing an aircraft comprising means for adjusting the glide angle of the aircraft, a sighting device mounted on the aircraft for sighting the landing point on the ground, said sighting device including a front sight means and a rear sight means, the line of sight of said sighting device being parallel to the flight path at a predetermined angle of glide of the aircraft, a pitch angle indicator mounted on the aircraft and including indicating means movable at a right angle to the line of sight of said sighting device and in a plane containing the vertical axis of the aircraft, said indicating means being in the line of sight upon optimal angle of glide of the aircraft, and means operatively connecting said sighting device and said glide angle adjusting means for conforming the angle of inclination of the line of sight of said sighting device with the adjusted angle of glide.

2. A system for landing an aircraft including a sighting device mounted on the aircraft for sighting the landing point on the ground, the line of sight of said device being parallel to the flight path, and a pitch angle indicator mounted on the aircraft, said pitch angle indicator comprising indicating means movable at a right angle to the line of sight of said sighting device and in a plane containing the vertical axis of the aircraft, said indicating means being in the line of sight upon optimal gliding angle of the aircraft when approaching the landing point, said sighting device including a rear sight and a front sight, at least one of said sights being vertically adjustably mounted on the aircraft.

References Cited by the Examiner

UNITED STATES PATENTS

| | | | |
|---|---|---|---|
| 1,256,987 | 2/18 | Dittemore | 33—47 |
| 1,716,821 | 6/29 | Karnes | 33—46 |
| 1,963,826 | 6/34 | Chilton | 33—46.5 X |
| 2,151,549 | 3/39 | Becker. | |
| 2,280,126 | 4/42 | Metcalf | 33—46.5 |
| 2,630,283 | 3/53 | Hanson | 244—77 |
| 2,737,640 | 3/56 | Barnaby | 73—178 X |
| 3,045,955 | 7/62 | Markusen et al. | 73—178 X |
| 3,128,623 | 4/64 | Gold | 33—46.5 X |

LOUIS R. PRINCE, *Primary Examiner.*